United States Patent [19]

Hume et al.

[11] 3,711,771

[45] Jan. 16, 1973

[54] RADIO-FREQUENCY POWER TESTING EQUIPMENT

[75] Inventors: Frederick R. Hume, Brea; Jack B. Seaton, Anaheim, both of Calif.

[73] Assignee: North American Rockwell Corporation

[22] Filed: Nov. 1, 1971

[21] Appl. No.: 194,365

[52] U.S. Cl. ............................324/57 R, 324/58 A
[51] Int. Cl. ...................................G01r 27/00
[58] Field of Search ..............324/57 R, 58 A; 330/2

[56] References Cited

UNITED STATES PATENTS

| | | | |
|---|---|---|---|
| 2,574,682 | 11/1951 | Ancona, Jr. | 330/2 |
| 2,627,546 | 2/1953 | Paine | 324/57 R X |
| 3,566,286 | 2/1971 | Freeman | 324/57 R X |
| 3,659,060 | 4/1972 | Wolff | 324/57 R X |

*Primary Examiner*—Stanley T. Krawczewicz
*Attorney*—L. Lee Humphries et al.

[57] ABSTRACT

Method and apparatus for measuring the peak power performance of a pulsed microwave power device as a unit-under-test, in which there is provided means for driving the unit-under-test with a constant power-level, swept-frequency source of RF energy as an applied input, and in which there is also provided means for pulse modulating the applied input. There is further provided means responsive to the time-averaged power output, pulse repetition rate and pulse width of the pulse modulated unit-under-test for indicating the peak power output thereof.

10 Claims, 12 Drawing Figures

PATENTED JAN 16 1973 3,711,771

INVENTORS
FREDERICK R. HUME
BY JACK B. SEATON

ATTORNEY

RADIO-FREQUENCY POWER TESTING EQUIPMENT

BACKGROUND OF THE INVENTION

The invention herein described was made in the course of or under a contract or subcontract thereunder, with the United States Air Force.

Quality control in the manufacture of RF energy devices such as pulsed radar transmitters and broadband power amplifying components thereof, including travelling wave tubes, magnetrons and klystrons, involves the peak power performance testing of such RF power devices to assure performance to specification. Several methods have been employed in the prior art to effect such testing and measurement, all of which suffer from certain disadvantages and limitations.

One technique of peak power measurement involves the use of a calorimeter in which a temperature change over ambient temperature is deemed indicative of heat dissipated by the device and hence indicative of the power performance thereof. Such calorimeters are of two types: a wet type in which a known fluid is passed through the calorimeter at a calibrated flow rate and the difference between the input and output fluid temperatures is noted; and a dry type in which a calibrated amount of a known granulated material is employed as a heat sink, and the temperature rise thereof noted. Such calorimeter techniques generally suffer the disadvantage of requiring considerable time in which to standardize the calorimeter readings due to the long thermal delays involved in such temperature responses. Also, the accuracies of the measurements so obtained are affected by variations in the ambient conditions under which such measurements are conducted. A further disadvantage of the calorimeter method is its instability at low power levels, as to require either an increase in the assigned uncertainty of the measurements obtained or a decrease in the interval between calibrations. Typically, the calibration interval is five weeks, while performance of the calibration itself may require forty man hours.

Another prior-art aspect of RF power measurement, known as the notch wattmeter approach, employs a directionally coupled bolometer or thermistor mount-power meter combination and calibrated attenuator to measure average power output in response to an open-loop calibrated applied RF power unit, the RF input power source utilizing a calibrated crystal technique wherein a second thermistor mount-power meter combination and calibrated attenuator are substituted for each discrete frequency of interest in the 10 milliwatt to 2½ watt power region. A double-throw switching input to a display device (such as a cathode ray oscilloscope), displays the pulsed output of the unit under test over a time-base of at least two successive pulse repetition intervals, the applied CW RF source being sampled and displayed during the intervals intervening the successive pulse widths of the UUT output. The displayed power level of the UUT pulsed output, time averaged over the pulse width thereof, is taken as the peak power performance thereof, deviations of such performance from the sampled CW RF source level being used to determine the quantitative extent of such UUT peak performance at such discrete radio frequency.

Such method of separate performance measurements at discrete frequencies is extremely slow, requiring an average of 15 minutes for each piece of equipment so tested. Such method also tends to be of limited accuracy due to opportunity for human errors in the many readings required and also due to the effects of applied input power level differences or variations between the number of discrete calibrated sources sequentially employed. Also, such protracted testing technique subjects the unit under test to additional stress, tending to reduce its overall reliability and useful life after test. An example of such technique is equipment Model BCS-1B Pulse Power Calibrator, manufactured by Weinschel Engineering of Gaithersburg, Md.

In brief, therefore, prior art techniques and apparatus for measurement of RF peak power performance have suffered from limited accuracy, slow speed and high man-hour calibration costs.

BRIEF DESCRIPTION OF THE INVENTION

By means of the concepts of the subject invention, the above-noted shortcomings of the prior art are avoided and there is provided method and apparatus for RF peak power performance measurement having increased accuracy, faster speed and involving lesser costs in man-hours for calibration over a protracted calendar interval of use.

In a preferred embodiment of the subject invention there is provided apparatus for evaluating the peak power performance of a pulse-modulated RF power amplifying means as a unit-under-test and comprising closed loop means for driving the unit-under-test with a constant power-level, swept-frequency source of RF energy as an applied input. The output of the driving means is pulse-modulated prior to application as an input to the unit-under-test. There is also provided means for determining the average power output of the pulse modulated unit-under-test as a function of the he swept-frequency of the RF source. The peak power performance of the unit-under-test is then determined by means multiplying the average power output of the unit-under-test by a value corresponding to the pulse repetition interval of the pulse modulation, and such product divided by a value corresponding to the pulse width.

By means of such arrangement, errors due to calibration variations in the successive application of discrete radio frequency sources are avoided. Also, the use of a swept-frequency source automatically provides increased data for a continuous spectrum in less time than that required to manually sample a limited number of discrete frequencies of such spectrum. Also, the use of automatic level control of the excitation of the swept-frequency source avoids the measurement errors associated with the use of successive discrete frequency excitation sources, as well as avoiding the additional calibration effort involved in calibrating such plurality of discrete frequency sources, while also allowing such performance to be conducted in a minimum amount of time.

Accordingly, it is an object of the subject invention to provide improved means for determining the peak power performance of pulsed RF power amplifying means.

It is another object of the invention to provide peak RF power measurement means of improved accuracy.

It is still another object to provide peak RF power measurement means requiring fewer man-hours to calibrate and maintain.

These and other objects of the invention will become apparent from the following description, taken together with the accompanying drawings, in which:

BRIEF DESCRIPTION OF THE DRAWINGS

In the figures, like reference characters refer to like parts.

DESCRIPTION OF THE PREFERRED EMBODIMENTS

Figure 1:
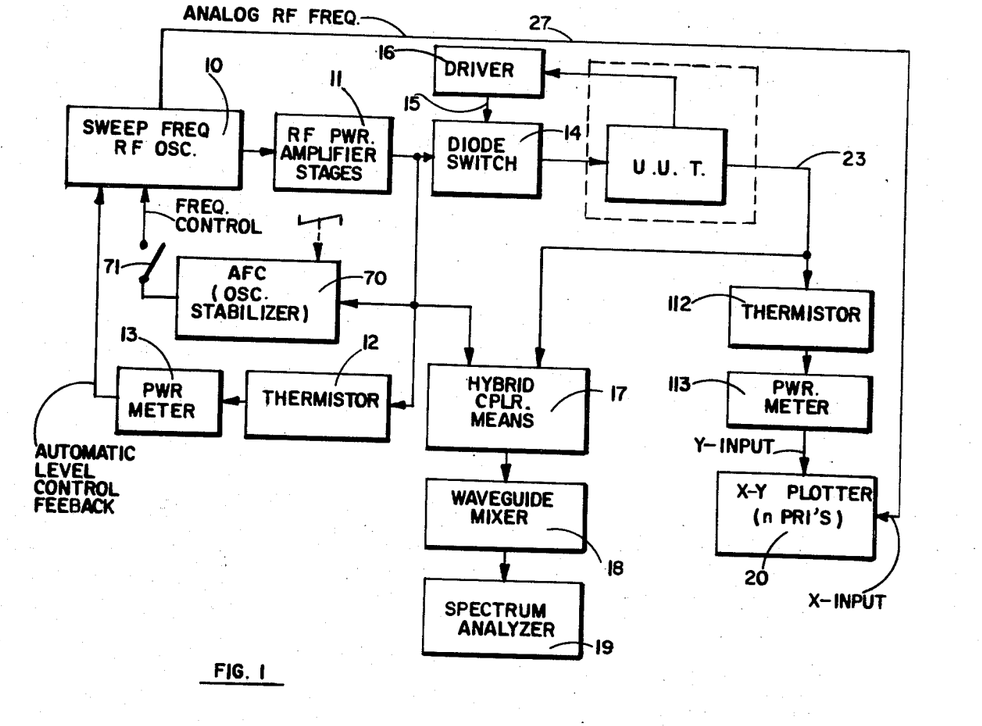
FIG. 1 is a block diagram of a system illustrating one aspect of the invention.

Referring now to FIG. 1, there is illustrated a system for testing a unit-under-test (UUT) such as a travelling wave tube (TWT), and comprising means for driving the UUT with a constant power level, swept-frequency source of RF energy. Such source includes a swept-frequency RF oscillator 10 output coupled to a broadband RF power amplifier stage 11. Regulation of the average output power level of power output stage 11 is achieved by means of a thermistor 12 responsive to the output of RF power stage 11 and in cooperation with a powermeter 13 for providing a power level feedback signal to sweep oscillator 10 for automatic power level regulation thereof. The regulated power output of RF power stage 11 is input-coupled to the unit-under-test (UUT) by means of a diode switch 14 having a switching control input 15 responsively coupled to a system trigger of the UUT by a driver-amplifier stage 16, whereby a pulse-modulated input is provided.

The resultant frequency-swept pulse modulated output of the UUT is mixed with the frequency-swept continuous wave output of power stage 11 by means of a hybrid coupler 17 output coupled to a waveguide mixer 18. The combined spectrum of the swept single spectral line output of power stage 11 and the spectral distribution of the UUT output are then fed from mixer 18 to a spectrum analyzer 19 for display purposes. Such display is illustrated for a series of successive discrete frequencies in FIGS. 5a, 5b and 5c. In such figures, there is a main spectral lobe having a center frequency $f_o$ corresponding to the carrier frequency output of the UUT, and a series of upper and lower sideband frequencies $(f_o \mp nf_R)$ the frequency spacing of which corresponds to the pulse repetition frequency $(f_r)$ or reciprocal of the pulse repetition interval, while the envelope 21 of the spectral lines follows a $(\sin X)/x$ shape, the width $(2/\tau)$ of the main spectral lobe of which being equal to twice the reciprocal of the pulse-width, as is explained more fully at pages 159, 160 in the text "Introduction to Radar Systems" by Skolnik (McGraw-Hill, 1962). There is also displayed a single spectral line 22, corresponding to the output frequency of oscillator 10 (of FIG. 1) during a sampled pulse interval, the displayed energy level per cycle being higher, in general, than that of the spectral spread of pulsed modulation envelope 21, as is well understood in the art.

Figure 5A:
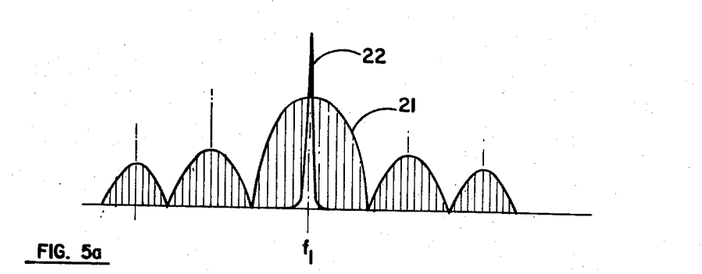
FIGS. 5a–5c are spectral diagrams illustrating the combined spectral response of one mode of the swept-frequency oscillator and the pulsed unit under test of FIG. 1.
Figure 5B:
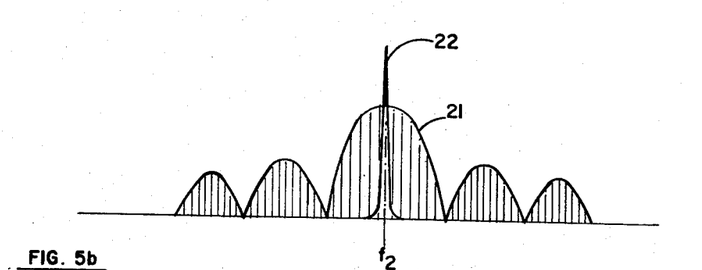
Figure 5C:
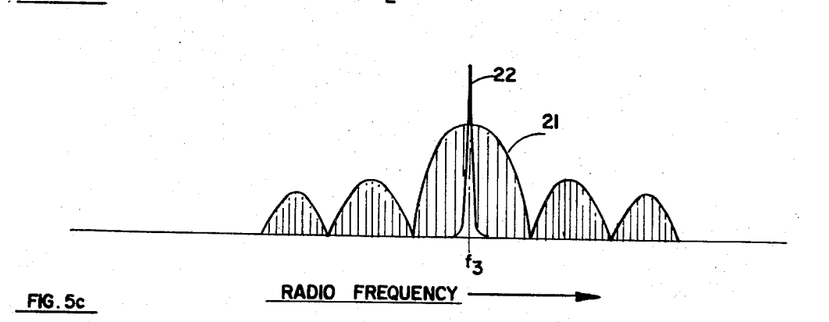

As may be determined from a comparison of FIGS. 5a, 5b and 5c, the scanning or sweeping of the output frequency of oscillator 10 (spectral line 22) from one pulse interval to a successive one serves to correspondingly frequency-translate envelope 21. In other words, as spectral line 22 translates to the right on successive pulse repetitions, so does spectral energy envelope 21.

There is also provided in FIG. 1 automatic frequency control means 70 having an input responsive to the output of element 11 for selective regulation.

Due to the normal response of the UUT, the frequency output thereof may vary from that of the input excitation applied thereto, which frequency shift is required to be measured in testing the UUT performance. The determination of the deviation of the UUT output frequency from an applied input excitation frequency is necessary, for example, in the calibration and use of the UUT in a coherent doppler system application wherein the doppler shift in the received signal is sought to be determined with precision. The testing of the UUT frequency shift requires an especially stable input frequency. Oscillator 10 must therefore be capable of operating at a selected discrete frequency and avoiding incidental frequency modulation due to power supply ripple. Accordingly, there is provided in FIG. 1 automatic frequency control means 70 having an input responsive to the output of element 11 for selective regulation of oscillator 10 when switch 71 is closed.

Closing switch 71 applies a helix control voltage to the helix of a backward wave tube of swept frequency source 10, as to slave or phase lock the frequency thereof to a selected one of a set of crystal references contained within oscillator stabilizer 70. In other words, the output of oscillator 10 is thus stabilized to a selected frequency.

Figure 6:
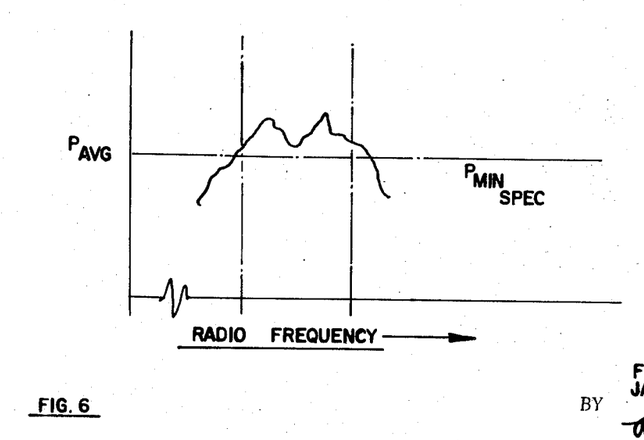
FIG. 6 is an illustration of the average power display presented by the plotter of FIG. 1.

There is further provided in FIG. 1 means for determining the average power performance of the UUT and comprising a second thermistor 112 responsive to the output of the UUT and output-coupled to a second powermeter 113 the thermal delay of thermistor 112 being at least as long as the pulsewidth but less than the pulsing interval of the pulse modulated UUT. The output of powermeter 113 is fed to one input of an X–Y plotter 20, a second input of plotter 20 being responsive to a voltage analog of the output frequency of swept oscillator 10. Thus, the display of plotter 20 corresponds to a display of average power per pulse repetition interval over that number (n) of intervals (PRI's) required to frequency scan oscillator 10, a representative display being shown in FIG. 6. Such display of average power may be employed to determine the peak power performance of the UUT, by means of the relationship:

$$\text{peak power} = \text{average power} \times \frac{\text{pulse repetition interval}}{\text{pulse width}} \quad (1)$$

Such technique, however, requires an eyeball estimate of the average value from such display and further means of determining the pulse repetition interval, the pulse width, the factor formed of the ratio of such pulse interval and width, and the product of such factor and average power value.

For a first approximation of reasonably stable pulse modulation, each of the pulse repetition interval and pulse width may be assumed to be sufficiently constant or invariant that the ratio thereof is similarly constant, whereby the peak power may be determined as a preselected factor of the average power determination in FIG. 1. However, where greater precision is required, the factor determined by precise ratio of pulse repetition interval to pulsewidth must be continuously or automatically monitored. Further, such automatic monitoring allows avoidance of human errors in gain-scaling data involving the testing of different equipment utilizing different pulse repetition intervals and pulse widths. Digital means for automatically performing such function is shown in FIG. 2.

Figure 2:
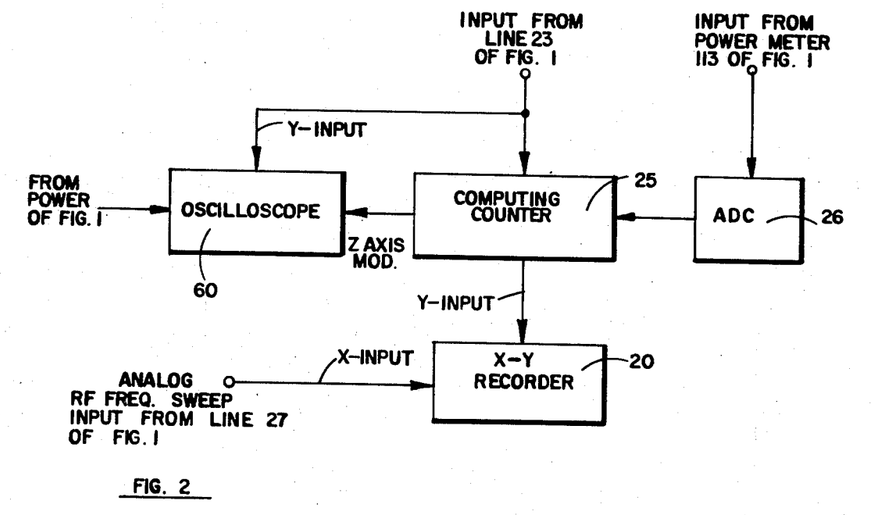
FIG. 2 is a block diagram of digital means adapted to cooperate with certain elements of FIG. 1 for computing peak power performance.

Referring now to FIG. 2, there is illustrated means for automatically determining the peak power performance of a pulse modulated RF power element and utilizing the average power signalling means of FIG. 1. There is provided a computing counter 25 having a first input coupled to output line 23 of the UUT for determining the ratio of pulse repetition interval to pulse width of the output signal therefrom. A second input of computing counter 25 is responsively coupled to the output of second powermeter 113 by means of an analog-to-digital converter 26.

In normal operation, clocked computing counter 25 counts the clock intervals between the leading edges of successive pulses occurring on line 23 to determine pulse repetition interval, and counts the clock intervals between a leading edge and subsequent trailing edge of each pulse to determine pulse width. The number of times the pulse width value may be taken out of or subtracted from the pulse interval value determines the ratio, PRI/PW; and the digital product of such ratio and the digitized average power is indicative of the peak power performance of interest.

The pulse repetition interval for which such peak power value is computed corresponds to an associated (average) radio frequency output of frequency-swept oscillator 10 (of FIG. 1). Thus, the application of such value as the Y- input of recorder 20 (the X-input being connected to line 27 of FIG. 1) provides a display of peak power performance versus radio frequency for the UUT.

Figure 7:
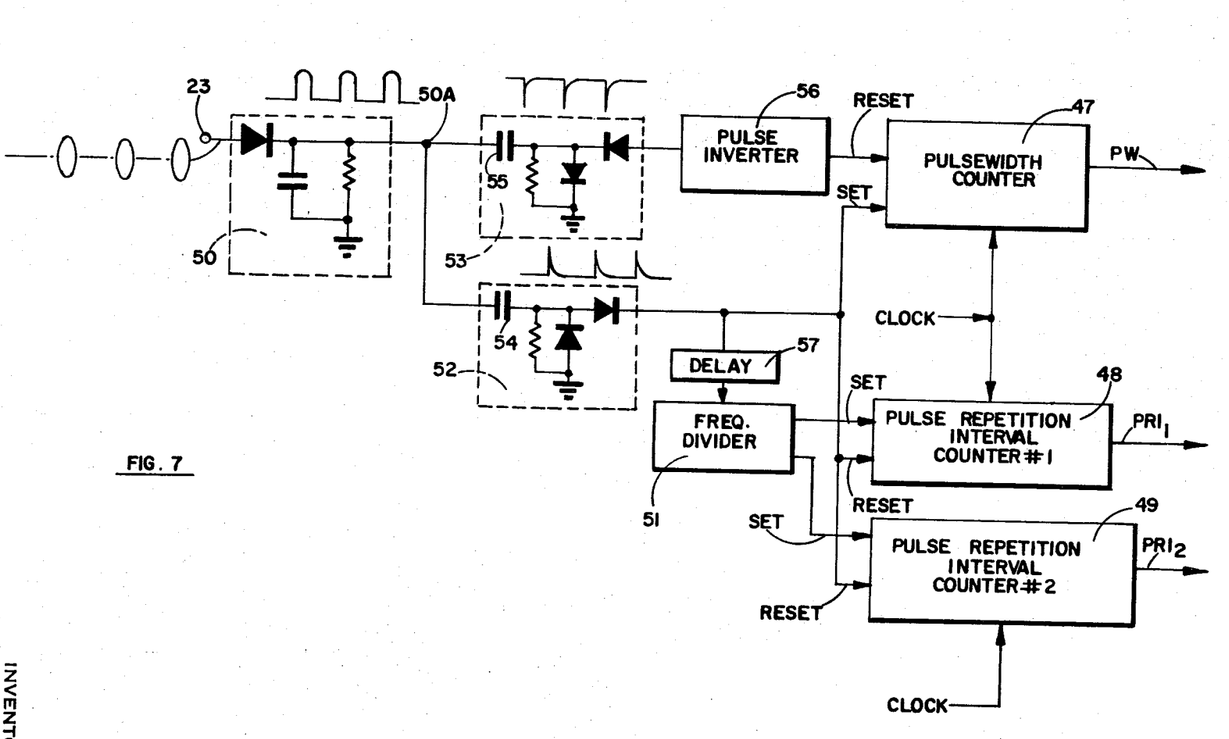
FIG. 7 is a block diagram of the pulsewidth and pulse interval measurement means of the computing counter of FIG. 2.

An exemplary arrangement of that portion of the computing counter 25 of FIG. 2 by which the pulsewidth and pulse repetition interval of the UUT pulse modulation are determined is shown in further particularity in FIG. 7.

Referring now to FIG. 7, there is illustrated a pulsewidth counter 47 responsive to a clock input and set and reset by the leading edge and trailing edge respectively of the envelope of a video-detected pulse modulated input for providing a clock count indicative of the pulsewidth of the pulse modulation. There is also illustrated a first and second mutually interlaced pulse repetition interval counter 48 and 49, responsive to the clock input and set and reset by alternate leading edges of the pulse modulation envelope. There is also provided in the arrangement of FIG. 7 a video envelope detector 50 responsive to the pulse modulated RF output on line 23 of FIG. 2 for providing a unipolar (video detected) output at terminal 50A. There is further provided a first and second circuit means 52 and 53 responsive to the leading edge and trailing edge respectively of the video pulse train occurring at terminal 50A. Each of circuit means 52 and 53 includes a differentiating capacitor 54 or 55, and preselectively poled diodes. Circuit means 52 is poled to be responsive to the polarity of the voltage rate of change of the leading edges of the video detected pulse train output of detector 50, and circuit means 53 is poled to be responsive to the polarity of the voltage rate of change of the trailing edges of the video detected pulse train. In other words, as illustrated, circuit 52 provides a positive pulse output in response to the occurrence of leading edges of positive-sense detected video pulses, and circuit 53 provides a negative pulse output in response to the occurrence of trailing edges of such positive-sense video detected pulses. By using the leading edge trigger output of circuit 52 as a set input and the trailing edge trigger output of circuit 52 as a successive reset input, counter 47 is enabled during the (pulsewidth) interval between such inputs to count a clock train interval corresponding to the pulsewidth of the pulse modulation. A pulse inverter 56 may be employed as required at the output of circuit 53 to match the sense of the applied input to the sense of the responsiveness of the reset input of counter 47.

The pulse repetition interval of the pulse modulated output of the UUT in FIG. 1 is determined from counting the clock train interval occurring between successive pulse leading edges. In other words, the leading edge of such pulse modulation envelope is employed as both a set and reset input to PRI counters 48 and 49. A delayed frequency divider 51 provides an output on alternative ones of two outputs for setting an alternative one of counters 48 and 49, while the undelayed leading edge trigger output of circuit 52 is commonly employed as an early reset input to counters 48 and 49. By means of the delay 57 interposed at the input of frequency divider 50, the counting one of alternate counters 48 and 49 is not prematurely reset by the same leading edge trigger as is employed as a set or "start count" input of an alternate one of counters 48 and 49.

Counters 47, 48 and 49, as well as divider 51, delay 57 and inverter 56, are well known in the art, and therefore these items are shown in block form only. Further, the gain-scaling of the average power input to element 25 via line 23 in FIG. 1 by means of a factor (PRI/PW) corresponding to the ratio of the pulse repetition interval to the pulse width, is well understood in the digital computing art. The iterative subtraction of the pulsewidth measurement from the pulse repetition interval measurement to obtain such factor is well known in the art of digital division, while the art of gain-scaling or multiplying a value (such as the average power input from ADC 26 in FIG. 2 to obtain a peak power indication on the Y-input of recorder 20 in FIG. 2) is also well understood in the digital computation art. Accordingly, means for effecting such steps in detail are not included in the disclosure of the subject invention.

In addition to the display or recordation of peak power per sampled frequency by X-Y recorder 20 in FIG. 2, there is also provided an oscilloscope 60 the Y-input of which is responsive to the (video detected) instantaneous power output of the UUT, the X-input being swept as a linear function of time. In other words, average power and pulsewidth are displayed by oscilloscope 60 in FIG. 2.

Figure 3:
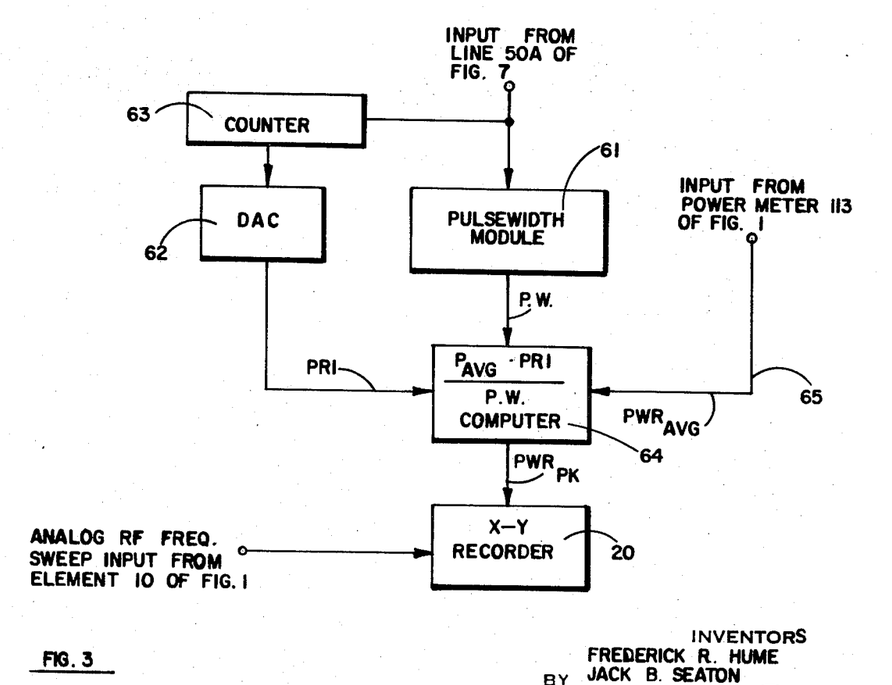
FIG. 3 is a block diagram of analog means adapted to cooperate with certain elements of FIG. 1 for computing peak power performance.

Although digital means for computing peak power as a function of average power, pulsewidth and pulse repetition interval has been illustrated in FIG. 2, the concept of the invention is not so limited and the utilization of analog means alternative to such digital means is comprehended, as illustrated for example in FIG. 3.

Figure 8:
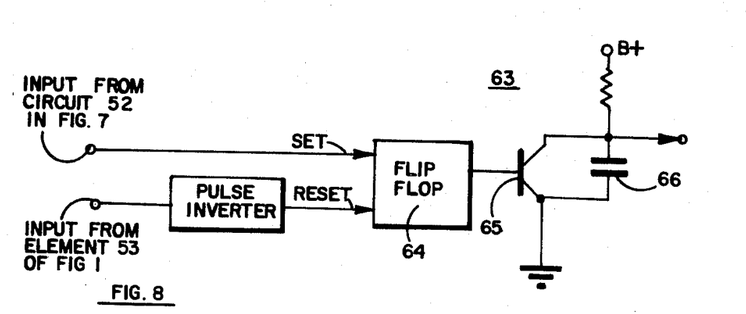
FIG. 8 is a schematic diagram of the pulse width module of FIG. 3.

Referring now to FIG. 3, there is illustrated alternative means for determining the peak power performance of a pulse modulated RF UUT as a function of the time-averaged power performance, pulse repetition interval and pulsewidth. There is provided in the arrangement of FIG. 3 a pulsewidth module 61 responsive to the video detector 50 of FIG. 7 for providing an output indicative of the pulsewidth of a pulse modulated RF input to detector 50 in FIG. 7 from the UUT of FIG. 1. Such module 61 is shown more particularly in FIG. 8 as comprising an R-C sweep generator 63 for providing a range signal output, the amplitude of which is indicative of the time elapsed between the occurrence of a set trigger input to flip-flop 64 from a (positive sense) leading edge trigger input from circuit 52 (in FIG. 7) and the occurrence of a reset input input to flip-flop 64 from pulse inverter 56 (in FIG. 7). The resetting of flip-flop 64 grounds the base of transistor 65, thereby shorting capacitor 66 of RC sweep generator 63 until the application of a subsequent set trigger. A peak detecting sample-and-hold circuit may be employed to store the terminal value of the analog sweep voltage as the pulsewidth value of interest by means well understood in the art of sample-and-hold circuitry.

The output from meter 113 (in FIG. 1) is an analog voltage of the average power output of the UUT. A third analog voltage corresponding to the pulse repetition interval of the UUT pulse modulation is provided in FIG. 3 by a digital-to-analog converter 62 responsive to an interval counter 63 corresponding to the interval counting arrangement of FIG. 7. The analog pulse repetition interval signal from element 62 and analog pulsewidth signal from element 61 are then utilized by analog computing means 64 to gain-scale the RF average power signal on line 65 by a factor corresponding to the ratio PRI/PW by analog means well understood in the art. Such art is indicated for example in U.S. Pat. No. 3,293,424 issued to B. Fisher for Analog Multiplier, including patents cited therein. An output from element 64 and representing an analog of the peak power performance of interest as a function of time is then fed to the Y-input of a recorder 20, having an X-input thereof response to UUT scan frequency input as a function of time, whereby a plot is obtained of UUT peak power performance as a function of radio frequency.

Hence, by means of the arrangement of FIGS. 2 and 3, automatic measurement of RF peak power performance is obtained, errors due to operator skill limitations are avoided, and the effects of variations in pulsewidth and pulse repetition interval on such peak power performance determination are accounted for, whereby increased accuracy is obtained. Further, reduced testing time and reduced stress of the UUT are achieved. However, certain variations in indicated peak power performance as a function of frequency may occur due to or be inherent in the response characteristics of certain classes of equipment (UUT's) as to obscure the true performance quality of such equipments. Calibration for such effects may be included in a digital memory for the digital processing arrangement of FIG. 2, as shown more fully in FIG. 4.

Figure 4:
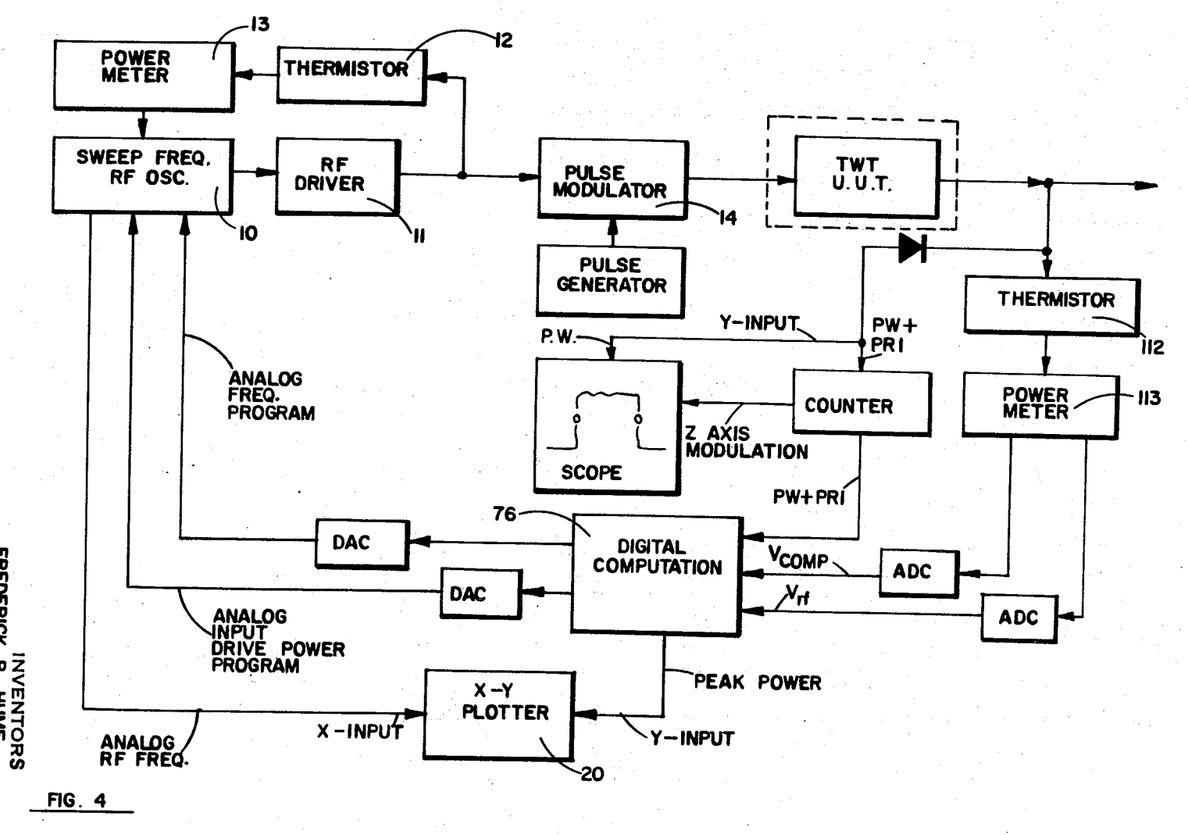
FIG. 4 is a block diagram of a further embodiment of the invention and including digital compensation for variations in system performance with swept-frequency.

Referring now to FIG. 4, there is illustrated a fully digitized system for peak performance testing of a pulse modulated RF power element and providing a read-out or plot of peak power performance versus the RF frequency associated with such performance.

Figure 9:
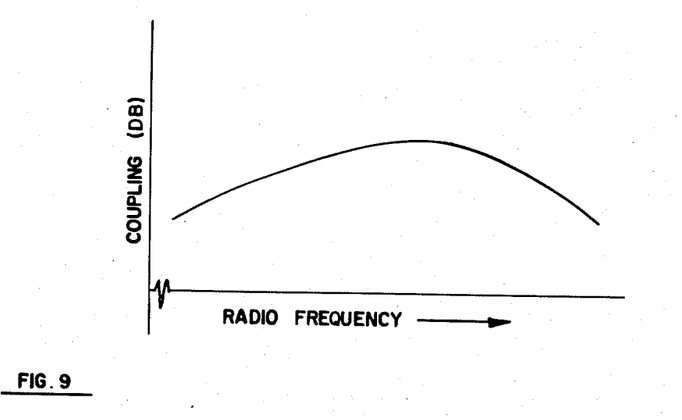
FIGS. 9 and 10 are representative frequency response diagrams of the branch and main outputs of a microwave coupler.
Figure 10:
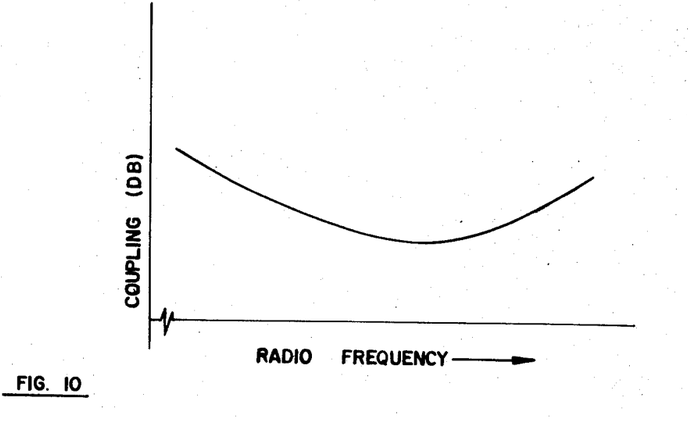

It is to be noted that in each of the illustrated embodiments a pair of commercially available directional couplers is used to reduce the average power of the output RF pulse train to a level which may be easily handled by the bolometer detector without damage thereto. Such coupler arrangement involves a first coupler responsive to the UUT and with a branch output having a representative frequency response corresponding to that shown in FIG. 9. A tandem connected second directional coupler is then employed, the main output of which has a somewhat compensatory frequency response corresponding to that in FIG. 10, whereby the tandem circuit arrangement for interconnecting the UUT output and the bolometer detector tends to demonstrate a flat frequency response. In other words, such compensatory directional coupling is achieved by employing two matched couplers each having a main output and a branch output, and taking advantage of the fact that the frequency response of the branch output tends to be compensatory of that of the main branch. Further gain-scaling (and frequency dependent compensation) may be achieved by an adjustable RF attenuator pad interposed between the output of the second coupler and the input to the bolometer detector.

In the arrangement of FIG. 4, several computational and control features are centralized in a digital computer 76, thereby allowing additional engineering economies in the design of the sweep control and oscillator stabilizer functions and the second power meter function, in addition to the peak power computation function. For example, the computation of average power may be completed by computer 76, employing the reference temperature (or compensatory) bolometer signal $V_{comp}$ and the temperature-responsive power measuring bolometer output $V_{rf}$ from powermeter 113, thereby allowing a reduction in the processing circuitry in powermeter 113. Also, the oscillator stabilizer function of elements 70 and 71 may be performed in computer 76, as to avoid the necessity of discrete system elements for such function. Further, the computer-stabilized oscillator 10 may be frequency-swept by a computer program of successive discrete frequencies applied by means of the oscillator stabilizer function. Applied input power to the UUT may also be programmed by means of computer 76. Moreover, where the frequency-response of the output coupler arrangement from the UUT is not sufficiently flat, the programmed levels of applied input power to the UUT may be compensatorily adjusted by computer memory as a function of the programmed discrete frequency.

Accordingly, there has been described improved RF peak power testing apparatus which provides increased accuracy, reduced testing time, less component stress and reduced calibration.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A machine method of evaluating the peak power performance of a pulse-modulated microwave transmitter tube as a unit under test and comprising the steps of
    driving said unit under test with a constant power level, swept-frequency source of RF energy as an applied input;
    pulse-modulating said applied input; and
    determining the average power output of said unit under test as a function of the swept frequency of said RF energy source.

2. A machine method of evaluating the peak power performance of a pulse-modulated microwave transmitter tube as a unit under test and comprising the steps of
    driving said unit under test with a constant power-level, swept-frequency source of RF energy as an applied input;
    pulse modulating said applied input;
    mixing a sample of said swept-frequency RF energy and a pulsed output of said unit under test; and
    displaying the combined spectrum of said RF energy and said pulsed output.

3. The method of claim 1 in which there is further included the steps of multiplying said average power output by a value corresponding to the pulse repetition interval of said pulse modulation to obtain a product; and
    dividing said product by a value corresponding to the pulse width of said pulse modulation to obtain a value indicative of said peak power performance of said unit under test.

4. The method of claim 1 in which said step of driving includes the further step of
    varying the driving level of said energy source test inversely with variations in the time averaged output power level thereof,
whereby a more nearly constant output power level of said driving step is obtained.

5. The method of claim 1 in which said step of driving includes the further step of regulation of the driving level of said energy source by driving control feedback of a time-averaged output of said source.

6. The method of claim 1 in which there is included the further steps of
    determining the pulse width of said pulsed output of said unit under test, and
    determining the peak power output of said unit under test as the product of said average power and pulse repetition interval, said product divided by said pulse width.

7. The method of claim 6 in which said peak power determination includes the further step of recording said peak power determination as a function of that frequency of said swept frequency source associated with said peak power determination.

8. Apparatus for evaluating the peak power performance of a pulse-modulated microwave power amplifying tube as a unit under test and comprising
    means for driving said unit under test with a constant power level, swept-frequency source of RF energy as an applied input;
    means for pulse-modulating said applied input; and
    means for determining the average power output of said unit under test as a function of the swept frequency of said RF energy source.

9. Apparatus for evaluating the peak power performance of a pulse-modulated microwave transmitter tube as a unit under test and comprising
    means for driving said unit under test with a constant power level, swept-frequency source of RF energy as an applied input;
    means for pulse modulating said applied input;
    means for mixing a sample of said swept-frequency RF energy and a pulsed output of said unit under test; and
    means displaying the combined spectrum of said RF energy and said pulsed output.

10. The device of claim 8 in which there is further included
    means for multiplying said average power output by a value corresponding to the pulse repetition rate of said pulse modulation to obtain a product; and
    means for dividing said product by a value corresponding to the pulse width of said pulse modulation to obtain a value indicative of said peak power performance of said unit under test.

* * * * *